United States Patent
Samaras et al.

(10) Patent No.: US 7,935,163 B2
(45) Date of Patent: May 3, 2011

(54) FILTERING DEVICE FOR DIESEL ENGINE EXHAUST GAS

(75) Inventors: Zissis Samaras, Thessaloniki (GR); Grigorios Koltsakis, Thessaloniki (GR)

(73) Assignee: Aristotle University Thessaloniki, Salonika (GR)

( * ) Notice: Subject to any disclaimer, the term of this patent is extended or adjusted under 35 U.S.C. 154(b) by 254 days.

(21) Appl. No.: 12/150,652

(22) Filed: Apr. 30, 2008

(65) Prior Publication Data
US 2008/0209872 A1    Sep. 4, 2008

(51) Int. Cl.
*B01D 46/00*    (2006.01)
(52) U.S. Cl. ......... 55/385.3; 55/482; 55/523; 55/525; 55/DIG. 30; 55/486
(58) Field of Classification Search .......... 60/297, 60/299, 303, 311; 422/177, 179, 180; 123/198 E; 55/282.3, 282.2, 385.3, 482, 484, 498, 510, 55/523, 524, 525, 527, DIG. 10, DIG. 30
See application file for complete search history.

(56) References Cited

U.S. PATENT DOCUMENTS

| | | | |
|---|---|---|---|
| 7,320,723 B2* | 1/2008 | Sewell, Sr. ............... | 55/512 |
| 7,473,288 B2* | 1/2009 | Toyoda et al. ............ | 55/282.3 |
| 2002/0168304 A1* | 11/2002 | Boehnke et al. ........... | 422/179 |
| 2004/0018134 A1* | 1/2004 | Liu et al. .................. | 423/247 |
| 2005/0047982 A1* | 3/2005 | Berriman et al. .......... | 423/235 |
| 2005/0220678 A1* | 10/2005 | Fujii et al. ................ | 422/177 |
| 2006/0029527 A1* | 2/2006 | Pellegrino et al. ......... | 422/177 |
| 2006/0078479 A1* | 4/2006 | Panov et al. .............. | 422/177 |
| 2006/0120937 A1* | 6/2006 | Zuberi ..................... | 423/215.5 |
| 2007/0104622 A1* | 5/2007 | Zuberi et al. ............. | 422/177 |
| 2007/0207070 A1* | 9/2007 | Zuberi ..................... | 422/180 |
| 2008/0199377 A1* | 8/2008 | Fan ......................... | 423/213.2 |

FOREIGN PATENT DOCUMENTS

| | | |
|---|---|---|
| DE | 40 12 719 A1 | 10/1991 |
| EP | 0 603 392 A | 6/1994 |
| EP | 0 879 939 A | 11/1998 |
| EP | 1 316 687 A | 6/2003 |

* cited by examiner

*Primary Examiner* — Duane Smith
*Assistant Examiner* — Minh-Chau Pham
(74) *Attorney, Agent, or Firm* — Meroni & Meroni, P.C.; Charles F. Meroni, Jr.; Christopher J. Scott

(57) ABSTRACT

A filtering device for diesel engines is based on metal foams. In order to achieve high filtration efficiency with low pressure drop using deep bed filtration metal foams, a radial flow concept is used based on a "porosity gradient". The foams can also be coated with catalytically active material to enhance soot oxidation (regeneration), as well as reduction of other exhaust gas pollutants (CO, hydrocarbons, nitrogen oxides). This may be accomplished by using non-uniform amounts of catalytic materials within the filter depending on the targeted application. An additional secondary filter segment may be placed within the metal support of the main filter segment. The metallic diaphragms at the entrance and exit of the external shell are designed in such a way as to allow the flow to be divided between the main and the secondary filter segments according to the respective flow resistances.

19 Claims, 2 Drawing Sheets

US 7,935,163 B2

FILTERING DEVICE FOR DIESEL ENGINE EXHAUST GAS

PRIOR HISTORY

This national stage patent application claims the benefit of international patent application number PCT/GR2006/000058 bearing an international filing date of 30 Oct. 2006.

FIELD OF THE INVENTION

The present invention relates to filtering devices for exhaust gases of diesel engines based on metal foams, comprising a metal shell defining a cavity with an intake pipe and an outlet pipe and a filtering device body made of layered metal foam sheets set in the path of communication between said intake pipe and outlet pipe.

BACKGROUND OF THE INVENTION

The metal foam material considered is disclosed in WO 2004089564 and WO 2005037467 further disclosing a manufacturing process, according to which the metal foam is produced in sheets with the desired length and width.

Foam based filters are known for diesel particulate filtering applications, although most of them are based on ceramic materials. Typically ceramic foams tend to exhibit pore sizes which need to be sufficiently small to achieve good filtration efficiencies resulting in a relatively high pressure drop, due to the large number of closed pores. Moreover, as more soot is accumulated in the filter, the latter foams are known to lower their filtration efficiency until a "blow-off" behavior, i.e. a negative efficiency, is observed.

Another drawback of the ceramic foams is the limitation in the shaping of the final filter. Therefore, it is very difficult to obtain a large filtration area in the limited space required in automotive applications.

Unlike most commercialized diesel particulate filters, which work based on the surface filtration mechanism, foam filters operate based on deep-bed filtration. This means that the soot is collected within the foam structure rather than on its surface. Based on current experience based on engine testing, a highly efficient filter with small pores will tend to accumulate much more soot near its entrance rather than towards its exit. This non uniform soot distribution is not favorable since the highly soot loaded regions of the filter will result in a non proportional increase of the pressure drop.

In the known prior art, the material proposed is merely referred to generally as porous metal thereby lacking specific teachings on the production process.

Besides, some known embodiments are defined by the need to support the thermal regeneration of the filters via the usage of electrical heaters. Therefore the usage of at least two cylindrical filter elements is called for. Due to the limitations related to the material, the production process of the filter elements and the need of multiple filter elements, the thickness of the filter elements is restricted in the region 0.5 to 20 mm, preferably 1 mm or more.

The pore size range proposed to be used between 100 and 600 µm is fairly small. Similarly the filtration thicknesses are very narrow. Besides, a simple reference is made to a "3-D trapping effect" thereby lacking to assess an understanding of the actual filtration mechanisms.

In EP 879939 of Sumitomo Electric Industries discloses an exhaust gas purifier, with filter elements formed of porous metal. This system needs a heating device for regeneration of the filter. In addition the pore size has to be identical on all filter elements for three reasons. First it makes it easier to manufacture the porous metal filter elements, secondly it avoids concentration of pressure loss on the smaller pores, and thirdly it makes it possible to increase the PM trapping quantity.

The material proposed is generally referred to as porous metal, without specifically detailing the production process. Besides the embodiments of FIG. 1 to 3 are defined by the need to support the thermal regeneration of the filters through the use of electrical heaters, notably at least two cylindrical filter elements. Due to the limitations related with the material, the production process of the filter elements and of the need of multiple filter elements, the thickness of the filter elements is restricted in the region 0.5 to 20 mm and more preferably 1 mm or more.

A still further known prior art DE 4012719 A1 of ROGGENKAMP et al. relates to dynamic foams resulting in the use of ceramic foams resulting in that they are not able to provide a porosity gradient. It includes also a heating device, aimed to burn the accumulated soot quite often, in order to avoid a too high pressure drop. Another drawback of the ceramic foams is the limitation regarding the shaping of the final filter. Therefore, it is very difficult to obtain a large filtration area in the limited space required in automotive applications.

EP 0 603 392 discloses a particulate trap, with filter elements made of mesh-like porous metal, using heat resistant metal. This sort of filter takes advantage of the conductivity of the metal, in order to withstand the temperature changes produced by the filter regeneration.

The pore size range proposed to be used particularly preferably from 100 to 600 µm is fairly small. Similarly the filtration thicknesses are very narrow.

AIM OF THE INVENTION

The purpose of the present invention is to remedy the aforementioned drawbacks and to achieve high filtration efficiency with low pressure drop using deep bed filtration metal foams. This is based on a radial flow concept, using a "porosity gradient" in the axial and/or transverse direction. Depending on the application, the foams can also be coated with catalytically active material to enhance soot oxidation (regeneration), as well as reduction of other exhaust gas pollutants such as CO, hydrocarbons, nitrogen oxides. This could be preferentially accomplished by using non-uniform amounts of catalytic materials within the filter.

SUMMARY OF THE INVENTION

The purpose of the invention is achieved by a filtering device of the type mentioned above in preamble, which is remarkable in that said filtering device body is made up of at least one filtering device segment, comprising a plurality of layers of metal foam sheets, which is set about the longitudinal axis of the shell in such a way as to define, inside the shell, an outer chamber, and an inner chamber. Said chambers communicate with said intake pipe and said outlet pipe in such a way that during use, the flow of the engine exhaust gases is forced from the outer chamber to the inner chamber, thus assuming a radial component of velocity with respect to the longitudinal axis of the shell.

The flow of the engine exhaust gases is then forced from a central chamber and from the outer chamber to said inner chamber —or vice versa—, thus assuming a radial component of velocity with respect to the longitudinal axis of the shell, wherein said filtering segments are composed of layers of metal foam sheets, wherein said filtering device is made of layered metal foam sheets set in the path of communication between said intake pipe and outlet pipe, thereby comprising a plurality of metal foam layers, wherein the porosity of the metal foam layers is variable.

An additional, secondary filter is placed within the metal support of the primary filter. The metallic diaphragms at the entrance and exit of the external shell are designed in such a way as to allow the flow to be divided between the primary and the secondary filter according to the respective flow resistances. This configuration further increases the flow area for the given external filter volume, providing additional pressure drop benefits. This may be done with a compromise in the filter thickness. The resulting adverse effect on filtration efficiency could be minimized by appropriate selection of the foam porosity.

As to document EP 0603392 A of Sumitomo Electric Industries, does not address the "porosity gradient" principle and use of catalytically coated foam material.

A still further known prior art DE 4012719 A1 of ROGGENKAMP et al. relates to dynamic foams resulting in that they do not provide a gradient porosity Still alternatively, said filtering body further comprises at least one secondary filtering segment, each comprising a plurality of layers of metal foam sheets, which are set about said longitudinal axis in said way and an inner chamber, the said chambers communicating with said intake pipe and said outlet pipe in such a way that during use, the flow of the engine exhaust gases is forced from a central chamber and from the outer chamber to said inner chamber —or vice versa—.

In the former case, it may be provided advantageously that said shell has a wall, which is connected at one end to a structure having a neck that defines the aforesaid intake pipe, said structure being closed at its opposite end by a diaphragm which has peripheral openings that force the flow of gas entering the shell to pass into the outer chamber set outside the filtering device segment, the opposite end of the cylindrical wall being closed by a diaphragm which has a central neck defining the outlet pipe and communicating with the inner chamber.

In the latter —vice versa— case however, said flow of gas is forced to leave the D1 does not make reference to variable porosity. The use of variable porosity is essential for the success of the present application because it results in a more favorable (uniform) soot accumulation within the metal foam which reduces the undesired system backpressure. Similarly the secondary filter segment of the present invention may have different porosity from the primary filter segment.

The present invention discloses in one of its embodiments a filtering device comprising filter elements made of metal foam with variable pore size, easy to manufacture, with low pressure loss and high PM trapping capacity.

Alternatively, the flow of the engine exhaust gases may be forced from the inner chamber to the outer chamber, i.e. vice versa.

Said achievement is accomplished based on a tubular filter design, where the flow is forced to pass through in the transverse direction. The high filtration area available to the flow is associated with reduced gas velocities. From fluid dynamics, it is known that the reduced flow velocity will lead to much lower pressure losses and increased filtration efficiency, especially for smaller sized particles.

The filter is formed by rolling metal foam sheets around an axisymmetric metal support that could be a porous metal tube. The layers of the foam adjacent to flow entrance are made of foam with larger pore size, whereas the layers adjacent to flow exit are made of foam with smaller pore size, aimed at a uniform soot distribution in the filter in a loaded state.

The filter segments thus proposed according to the invention incorporating the usage of a porous tube are rolled around a porous metal tube support.

According to an advantageous embodiment of the invention, the pore size of the foam may vary in the range between 400 and 1800 microns or even as from 200 microns. The pore size range proposed is thus much wider than the one suggested to be used in said known prior art, these restrictions whereof do not apply to the present invention.

Advantageously, the thickness of each foam sheet is 1.5 mm for the lowest pore sizes and 4 mm for the largest pore sizes. This foam can be easily shaped to form cylindrical structures by rolling.

Still advantageously, a large filtration area could be obtained if the filter is shaped in a tubular configuration in such a way as to be radially traversed by the exhaust gas flow. This is technically possible in the case of the metal foam considered in the present invention.

On the other hand, a more uniform distribution of the filtered soot can be achieved with a combination of various foam structures, with larger pores near the flow entrance and progressively smaller pores near the flow exit of the foam sheets. This configuration referred to as "porosity gradient" is technically feasible with the metal foam material considered here. A remarkable feature of a device according to the invention consists in that the porosity of the metal foam layers is variable along the filtration depth.

Moreover, according to a preferred embodiment of the invention, the foam can be easily coated with catalytically active materials typically used in automotive applications, resulting in a catalytically coated foam, that can catalytically initiate filter regeneration. Catalytically coated foam, i.e. catalytically initiated regeneration, is thus appealed on. The device according to the invention is so designed as to make maximum usage of the catalytic effects. Hence there is no need for any additional support for thermal regeneration, such as electrical heaters. There is neither any restriction to the usage of at least two cylindrical elements. Neither EP 879939 nor EP 0603392 makes reference to catalytic materials.

Depending on the application, the foams can thus also be coated with catalytically active material to enhance soot oxidation (regeneration), as well as reduction of other exhaust gas pollutants such as CO, hydrocarbons, nitrogen oxides. This could be preferentially accomplished by using non uniform amounts of catalytic materials within the filter depending on the targeted application.

In a variation of the proposed invention, the filter can be designed in such a way as to ensure very high filtration efficiency when clean and ensure a non-blocking behavior in case the soot loading in the filter reaches extremely high values due to various reasons, e.g. prolonged low temperature operation.

Real world testing so far has shown that a deep-bed based particulate filtration efficiency of the order of 80 to 95% is possible with acceptable pressure drop using a coated foam filter appropriately shaped to allow flow in a radial direction. Due to the governing diffusion-based filtration mechanism, the filtration efficiency is highest —close to 100%—for the smaller particle sizes, e.g. smaller than 20 nm. It is assessed that the soot capacity limit of the filter may exceed 15 grams/liter, which is almost double compared to standard wall-flow systems.

The regeneration potential of this filter at low temperatures —between 250 and 450° C.—has proven to be superior compared to standard catalyzed ceramic wall-flow filters. The catalytic coating is also able to attain a near 100% conversion of CO and hydrocarbons at temperatures of the order of 200° C. At the same time, the foam based filters with pore size of 600 microns or less exhibit no tendency for blowing-off the accumulated soot during any possible realistic driving condition.

In some applications such as retrofitting existing engines with no possibility of forced regeneration, the primary requirement is that the filter shall not block the engine by exerting an extremely high backpressure. Such high backpressure will occur in any filter accumulating soot with high efficiency and operating under low temperature conditions, e.g. 100-250° C., typically met in urban driving.

One possibility to avoid this issue is to use a filter that exhibits a decreasing filtration efficiency as the soot loading increases. Such a filter will tend to equilibrate (zero efficiency) at an acceptable backpressure level for the engine. Using a carefully selected combination of foam porosities, it is possible to design the filter in such a way as to reach the aforementioned target.

Depending on the application, the metal foams can be coated with any catalytically active material. Possible applications cover diesel oxidation catalysts, "3-way" catalysts, lean NOx catalysts and traps, NOx Selective Catalytic Reduction. The catalytic coating could also be used to enhance the oxidation rate of the accumulated soot in filtration devices.

In another embodiment of the invention, which is suitable for low temperature applications with reduced filtration efficiency at loaded conditions, the pore structure of the secondary filter could be selected so as to exhibit reduced filtration efficiency at loaded conditions. In the case of prolonged low temperature operation, the main filter, designed for high efficiency, may reach a blocking condition-extremely high flow resistance. Consequently, the flow will be self directed to the secondary filter which exhibits a smaller flow resistance, due to its more open structure and its limited soot loading capacity.

DETAILED DESCRIPTION

Figure 1:
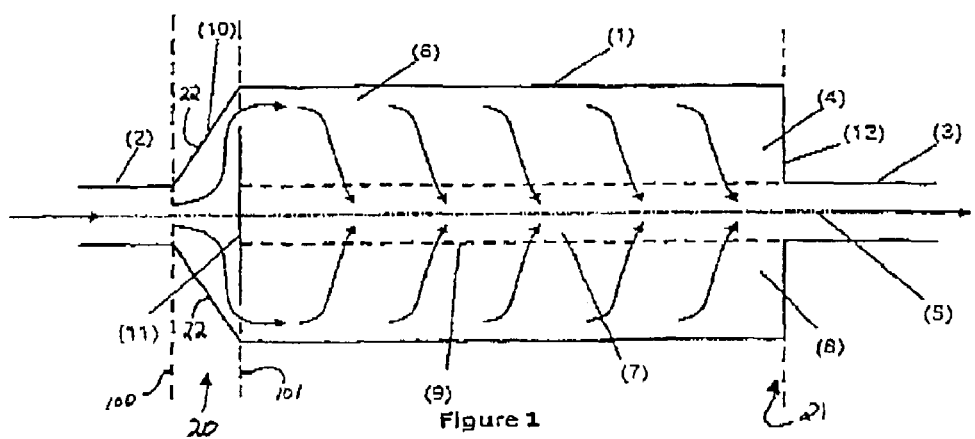
FIG. 1 resp.

With reference to FIG. 1, a metal shell 1 defines a cavity with an intake pipe 2 and an outlet pipe 3 and a filtering body 4 made of layered metal foam sheets set in the path of communication between said intake pipe 2 and outlet pipe 3. It includes one filter segment where the exhaust is forced to flow from the outer diameter of the filter segment towards the outlet pipe.

In FIG. 1, the filtering body 4 is made up of one segment 8, comprising a plurality of metal foam sheets, rolled around a porous metal support 9, with a porosity preferably higher than 40%. In case the foam is available in foam sheets of few millimeters thickness, a multitude of foam sheets should be rolled around the porous metal support 9, until the required thickness in the radial flow direction is obtained, typically few centimeters. In case the foam material is already available in a tubular form with an internal diameter equal to the metal support external diameter, this can be readily applied around the metal support.

The filter segment is set about the longitudinal axis 5 of the shell 1 in such a way as to define, inside the shell 1, an outer chamber 6, and an inner chamber 7, the said chambers communicating with said intake pipe 2 and said outlet pipe 3 in such a way that during use, the flow of the engine exhaust gases is forced from the outer chamber 6 to the inner chamber 7, thus assuming a radial component of velocity with respect to the longitudinal axis 5 of the shell 1.

Figure 2:
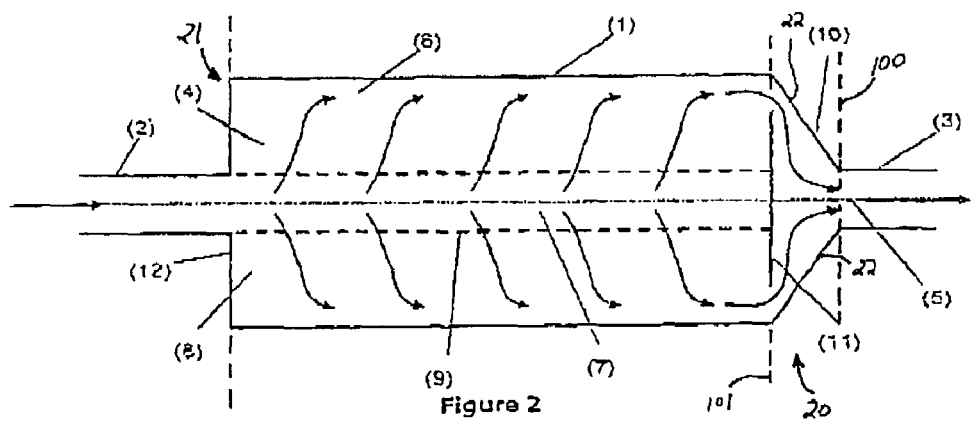
FIG. 2 illustrates a first embodiment resp. a second embodiment, which is similar to the one shown in FIG. 1, with the filter placement in the flow direction being opposite.

The system shown in FIG. 2 has the same geometrical configuration as the one of FIG. 1, but the filter placement in the flow direction is opposite. It includes one filter segment where the exhaust is forced to flow from the inner diameter of the filter body 4 towards the outlet pipe 3.

For both configurations shown in FIG. 1 and FIG. 2, the porosity of the foam layers is preferably variable with the layers near the flow entrance having larger pores and the layers near the flow exit having smaller pores. This will ensure a more uniform distribution of soot within the foam structure resulting in pressure drop benefits. The foam material is advantageously coated with a catalyst, preferably noble metal, particularly Pt-based.

The preferred amount of Pt loading to be used is of the order of 2-5 grams/liter of foam near the entrance, 1-2 grams/liter in the middle and down to zero near the flow exit. This will ensure that most of the catalyst is in close vicinity with the accumulated soot during real world operation, which increases the exploitation of the catalytic activity with possibility to minimize the necessary amount of Pt.

Figure 3:
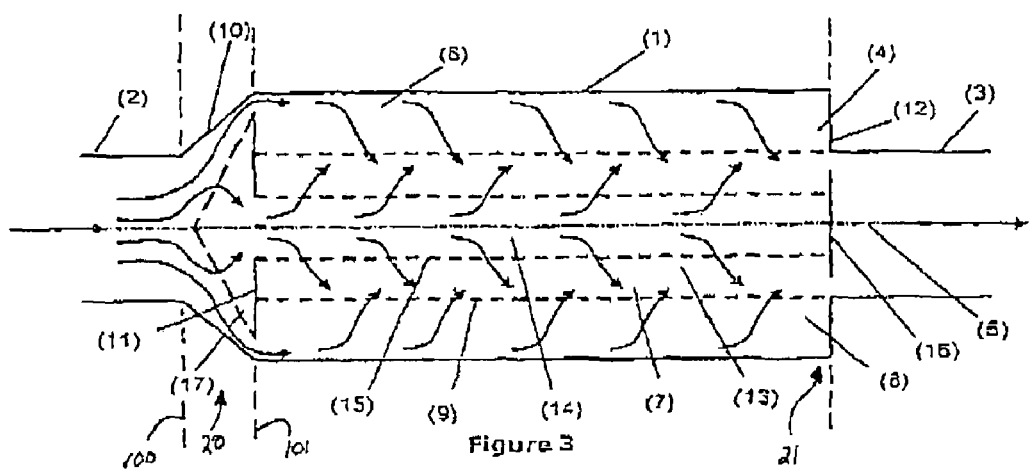
FIG. 3 illustrates a first embodiment of the invention.

The filter shown in FIG. 3 includes two filter segments. The filtering body 4 is made up of at least one main 8, resp. secondary 13 filter segment, each comprising a plurality of layers of metal foam sheets, which are set about the longitudinal axis 5 of the shell in such a way as to define, inside the shell 1, an outer chamber 6, a central chamber 14, and an inner chamber 7, the said chambers communicating with said intake pipe 2 and said outlet pipe 3 in such a way that during use, the flow of the engine exhaust gases is forced from the central chamber 14 and from the outer chamber 6 to the inner chamber 7, thus assuming a radial component of velocity with respect to the longitudinal axis 5 of the shell 1. A perforated metal cone could be embodied to control the desired flow distribution between the two filter segments.

This design achieves a higher filtration area for the same overall volume with a compromise in filtration depth. This design is favorable in case of relatively low pore sizes where a filtration depth of the order of 1-2 cm is usually enough to ensure a filtration efficiency higher than 80%. The exhaust flow will be distributed between the main and the secondary filter segments according to the respective flow resistances.

Due to the higher face area of the main segment, the flow will preferentially go through this segment at least when the filter is clean or moderately loaded with soot. The inner and outer dimensions of the main and secondary filter segments can be appropriately designed to achieve the preferred flow distribution, taking into account the filtration and pressure drop requirements. As regards the porosity of the foams and the catalyst distribution, the same considerations apply as already mentioned in the case of FIGS. 1 and 2.

Figure 4:
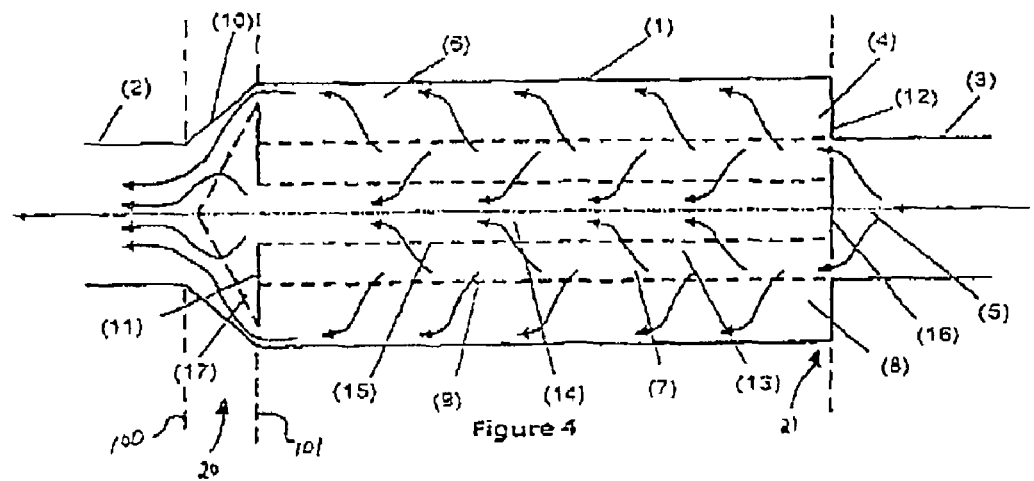
FIG. 4 illustrates a second embodiment of the invention, which is similar to the one shown in FIG. 3, with the filter placement in the flow direction being opposite.

The system shown in FIG. 4 has the same geometrical configuration as the one of FIG. 3, but the filter placement in the flow direction is opposite.

To achieve high filtration efficiency with the configuration of FIG. 3, it is preferred to pass as much as possible of the flow through the main filter segment 8 as long as its flow resistance is acceptably low. This can be enhanced by using a perforated metal cone 17 at the filter inlet as shown in FIG. 3. The function of this cone is firstly to minimize flow separations near flow entrance and guide the flow towards the main filter segment 8 and secondly to lower the flow rate through the secondary filter segment 13 by imposing an additional flow resistance through the small holes.

Therefore, under normal operation, the largest portion of the flow, i.e. up to more than 60% will be guided through the main filter segment. In case of blocking of the main filter segment e.g. unacceptably high flow resistance due to excessive soot accumulation during prolonged urban driving, the flow will preferentially pass through the holes of the perforated metal cone and the secondary filter segment 13. By proper design of the filter segment dimensions and the cone holes, it is possible to adjust the flow distributions so that the filter will never block during normal operation, while its filtration efficiency will be high during normal driving conditions.

The embodiments shown on FIGS. 3 and 4 are based on an operation principle that is not addressed in the cited prior art. They are suitable for low temperature applications, with reduced filtration efficiency at loaded conditions.

While the foregoing descriptions contain certain, specificity, the same should not be construed as limiting the scope of the invention, but rather as an exemplification of the invention. In this regard, it is contemplated that the essence of the invention teaches a filtering device for diesel engines exhaust gas comprising a metal shell (as at 1) having a longitudinal axis (as at 5), an inlet pipe (as at 2), an outlet pipe (as at 3), a single frustoconical first shell end (as generally referenced at 20), and a single planar second shell end (as generally referenced at 21).

It will be noted from an inspection of the figures that the first and second shell ends 20 and 21 are preferably orthogonal to the longitudinal axis 5 and that frustoconical first shell end 20 has angled walls 22 extending intermediate a pipe interface plane 100 and a flow diversion plane 101. The metal shell 1 further defines a cavity with a filtering device body extending intermediate the intake and outlet pipes 2 and 3, which filtering device body comprises a primary filtering segment, a secondary filtering segment, and an end-located diaphragm (as at 11).

The end-located diaphragm 11 transversely extends in the flow diversion plane 101 adjacent the pipe interface plane 100 (substantially parallel thereto) for altering the flow of engine exhaust gases within the frustoconical first shell end 20. The primary and secondary filtering segments are arranged about the longitudinal axis 5 of the shell 1 in such a way as to define, inside the shell 1, an outer chamber and an inner chamber. The inner and outer chambers communicate with the intake pipe 2 and the outlet pipe 3 in such a way that during use, the flow of the engine exhaust gases is forced from the outer chamber to the inner chamber —or vice versa—.

Further, the flow of the engine exhaust gases is forced from a central chamber and from the outer chamber to said inner chamber —or vice versa—thereby assuming a radial component of velocity with respect to the longitudinal axis 5 of the shell 1. The filtering segments are preferably composed of or comprise a plurality of layers of metal foam sheets set in the path of communication between said intake pipe 2 and outlet pipe 3, wherein the porosity of said metal foam layers is variable.

We claim:

1. A filtering device for diesel engines exhaust gas, comprising a metal shell having a longitudinal axis, an inlet pipe, an outlet pipe, a single frustoconical first shell end, and a single planar second shell end, the first and second shell ends being orthogonal to the longitudinal axis, the frustoconical first shell end having angled walls extending intermediate a pipe interface plane and a flow diversion plane, the metal shell defining a cavity with a filtering device body extending intermediate the intake and outlet pipes, the filtering device body comprising primary and secondary filtering segments, and an end-located diaphragm, the end-located diaphragm transversely extending in the flow diversion plane adjacent the pipe interface plane for altering the flow of engine exhaust gases within the frustoconical first shell end, the primary and secondary filtering segments being arranged about said longitudinal axis of the shell in such a way as to define, inside the shell, an outer chamber and an inner chamber, the said chambers communicating with said intake pipe and said outlet pipe in such a way that during use, the flow of the engine exhaust gases is forced from the outer chamber to the inner chamber —or vice versa— and wherein the flow of the engine exhaust gases is forced from a central chamber and from the outer chamber to said inner chamber —or vice versa—, thus assuming a radial component of velocity with respect to the longitudinal axis of the shell, wherein said filtering segments are composed of a plurality of layers of metal foam sheets set in the path of communication between said intake pipe and outlet pipe, wherein the porosity of said metal foam layers is variable.

2. The filtering device according to claim 1, wherein said layers of metal foam sheets are substantially concentric.

3. The filtering device according to claim 1, wherein said porosity of the metal foam layers is variable essentially along the filtration depth, resp. in a direction which is perpendicular to said longitudinal axis, and/or along the direction of said longitudinal axis.

4. The filtering device according to claim 3, wherein it comprises a combination of various foam: structures, with larger pores near the flow entrance and progressively smaller pores near the flow exit of the foam sheets, wherein the layers near the flow entrance have larger pores than the layers near the flow exit which have smaller pores.

5. The filtering device according to claim 4, wherein the pore size of the metal foam layers varies in the range between 200 and 1800 microns, in particular between 400 and 1800 microns.

6. The filtering device according to claim 1, wherein the thickness of each foam sheet is approximately 1.5 mm for the lowest pore sizes and approximately 4 mm for the largest pore sizes.

7. The filtering device according to claim 1, wherein a supporting means is provided for supporting the filtering segments which is rolled around said support, in particular consisting in a metal tube.

8. The filtering device according to claim 1, wherein said support is made of porous metal.

9. The filtering device according to claim 1, wherein each foam sheet is made of a metal alloy with, suitable mechanical properties to allow forming in a tubular shape.

10. The filtering device according to claim 1, wherein the metal foam layers are coated with catalytically active material, preferably in a non uniform amount.

11. The filtering device according to claim 10, wherein the metal foam layers are coated with noble metal based catalytically active material, particularly wherein said noble metal is Platinum.

12. The filtering device according to claim 11, wherein the catalytic loading of the metal foam layers is variable essentially in the direction which is perpendicular to said longitudinal axis and/or along the direction of said longitudinal axis.

13. The filtering device according to claim 12, wherein the catalytic loading of the metal foam layers is variable with the layers near the flow entrance having a higher loading and the layers near the flow exit having a lower loading.

14. The filtering device according to claim 1, wherein it comprises a mean which distributes exhaust gases automatically to a secondary filter element in case of too much backpressure of the main filter, thus guaranteeing a minimum backpressure to the engine.

15. The filtering device according to claim 14, wherein it comprises a metal cone for directing and distributing the flow entering the shell to the central chamber and the outer chamber.

16. The filtering device according to claim 15, wherein said metal cone is perforated.

17. A diesel engine exhaust filtering device system comprising a plurality of filtering device combinations and wherein each combination includes a filtering device according to claim 1.

18. The system according to claim 17 comprising a plurality of combinations, each including a said device in both serial and/or parallel arrangements resp.

19. The system according to one of the claims 17 further comprising a conduit having a cavity defined by an inner surface and wherein each combination is received in the cavity.

* * * * *